United States Patent [19]

DeBruyne

[11] 4,132,131

[45] Jan. 2, 1979

[54] FREE-FLOATING PLANETARY TRANSMISSION WITH CONTRA-ROTATING DUAL OUTPUT SHAFTS

[75] Inventor: Neil A. DeBruyne, Little Falls, N.J.

[73] Assignee: Curtiss-Wright Corporation, Woodridge, N.J.

[21] Appl. No.: 815,551

[22] Filed: Jul. 14, 1977

[51] Int. Cl.² .................... F16H 37/06; F16H 57/00; F16H 1/28
[52] U.S. Cl. ................................ 74/675; 74/410; 74/665 K; 74/797; 74/801
[58] Field of Search ............... 74/797, 675, 861, 410, 74/674, 665 K

[56] References Cited

U.S. PATENT DOCUMENTS

| | | | |
|---|---|---|---|
| 2,700,311 | 1/1955 | Bade | 74/674 |
| 3,188,884 | 6/1965 | Bancroft | 74/665 K |
| 3,307,426 | 3/1967 | Whitaker | 74/675 |
| 3,540,311 | 11/1970 | Chillson | 74/797 |
| 3,646,834 | 3/1972 | Davis | 74/674 |

*Primary Examiner*—Leonard H. Gerin
*Attorney, Agent, or Firm*—Arthur L. Frederick

[57] ABSTRACT

A transmission having free-floating, compound, planetary gears in which the net moment tending to tilt each compound planetary gear out of its radial plane is substantially zero and in which said transmission provides contra-rotating dual output shafts and/or said transmission is capable of having multiple inputs.

12 Claims, 7 Drawing Figures

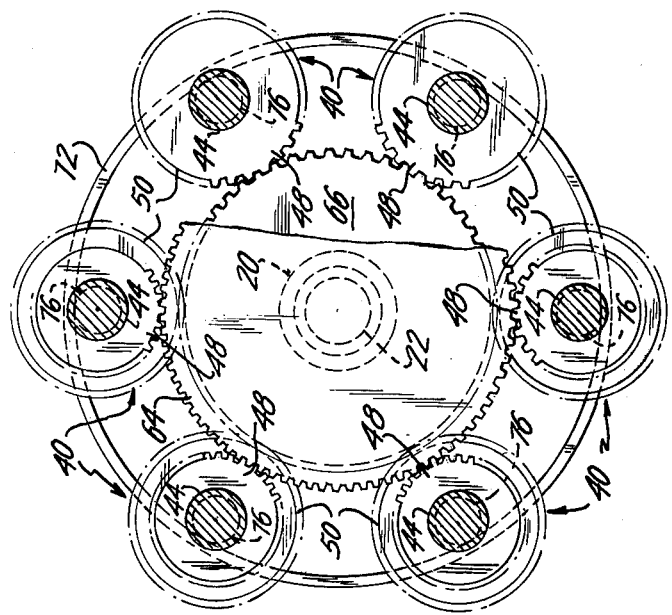

4,132,131

FREE-FLOATING PLANETARY TRANSMISSION WITH CONTRA-ROTATING DUAL OUTPUT SHAFTS

BACKGROUND OF INVENTION

This invention relates to planetary transmissions of the type disclosed in U.S. Pat. No. 3,540,311 granted Nov. 17, 1970 to C. W. Chillson. This prior patent discloses a planetary transmission in which the planetary elements are not provided with the usual support bearings which constrain the planetary elements against radial and tilting movements and instead, each of the planetary elements of the transmission include a plurality of axially-spaced gears which are so spaced along the spindle of their planetary elements that the net turning moment exerted by the input, output and reaction forces tending to tilt said element out of its radial plane is substantially zero. In addition, floating rings having rolling contact with the spindles of the planetary elements are provided to constrain the planetary elements against the radial forces thereon. Such a transmission is herein called a free-floating planetary transmission.

As described in said prior patent, such free-floating planetary transmissions have numerous advantages including the provision of a high speed ratio reduction at a substantial savings in weight over conventional planetary transmission. Applicant's assignee has built and successfully operated free-floating transmissions capable of transmitting as much as 750 horsepower.

The transmissions disclosed in said prior Chillson patent are not readily suitable for use with a plurality of independent power inputs, for example, for a marine propulsion transmission for providing a substantial speed-ratio reduction between a pair of side-by-side power units and the propeller system, and in which each power unit has an in-line connection with the transmission.

Said prior Chillson patent (FIG. 18) discloses a free-floating planetary transmission having co-axial, contra-rotating dual output shafts. However, with the configuration shown in this prior patent, the torque division between the two output shafts must be known in order to properly space the planet gears so that the net tilting moment on the planetary elements is zero. For example, in lines 54–55, column 16 of said Chillson patent the output torques of the two shafts are assumed to be equal. Obviously, however, when the output shafts are connected to dual helicopter propellers or to dual marine propellers, it is not possible to design the propellers for precisely equal load absorption. Hence, in the Chillson contra-rotating dual output configuration it may not be possible to achieve substantially zero tilting moment on the planetary elements. Because of the absence of normal support bearings for the planetary elements of a free-floating, planetary transmission, any significant tilting moment on the planetary elements would result in excessive stresses in the gear teeth of the planetary elements.

SUMMARY OF THE INVENTION

It is an object of the invention to provide a free-floating, planetary transmission which avoids the prior art difficulties in providing such a transmission with a plurality of inputs and/or with co-axial, contra-rotating dual outputs.

In accordance with the invention, a free-floating planetary transmission has a plurality of circumferentially-spaced planetary elements each with a spindle having a plurality of axially-spaced planet gears and a ring gear co-axial with the transmission is disposed to surround the planetary elements, said ring gear having internal teeth disposed in mesh with one of the planet gears of each planetary element to provide the torque input to said elements. This ring gear also has a second set of gear teeth, preferably external gear teeth, disposed in mesh with a plurality of circumferentially-spaced input gears. With this arrangement the free-floating planetary transmission can, for example, be provided with two parallel input shafts disposed on diametrically opposite sides of the transmission, each having a gear disposed in mesh with said ring gear whereby two laterally-spaced parallel engines could readily be connected to a single free-floating planetary transmission. Such a free-floating transmission can readily be designed to accommodate the necessary lateral spacing of the engine units. Floating rings having rolling contact with the planetary elements would be provided to restrain these elements against radial forces.

Also, in accordance with the invention, each planetary element of the transmission not only includes the aforementioned input gear but also includes two additional axially-spaced gears on the spindle of said planetary element and a pair of co-axial output gears are disposed in mesh with said two additional gears to provide contra-rotating, dual outputs for the free-floating planetary transmission. The arrangement is such that the entire reaction torque required to drive one output gear is provided by the other output gear. In this way, if one output gear tends to take more of the output torque, it will slow down to cause the other output to speed up to absorb more torque. Accordingly, the torque division between the two output shafts will remain constant and, therefore, the three gears of each planetary element can be spaced so that any moment tending to tilt the element out of its radial plane remains substantially zero under all operating conditions. As already noted, this is not true of the aforementioned Chillson patent.

Other objects of the invention will become apparent upon reading the annexed detailed description in connection with the drawings.

BRIEF DESCRIPTION OF THE DRAWINGS

FIGS. 2 and 3 are sectional views taken along lines 2—2 and 3—3 of FIG. 1;

DESCRIPTION OF PREFERRED EMBODIMENT

Figure 1:
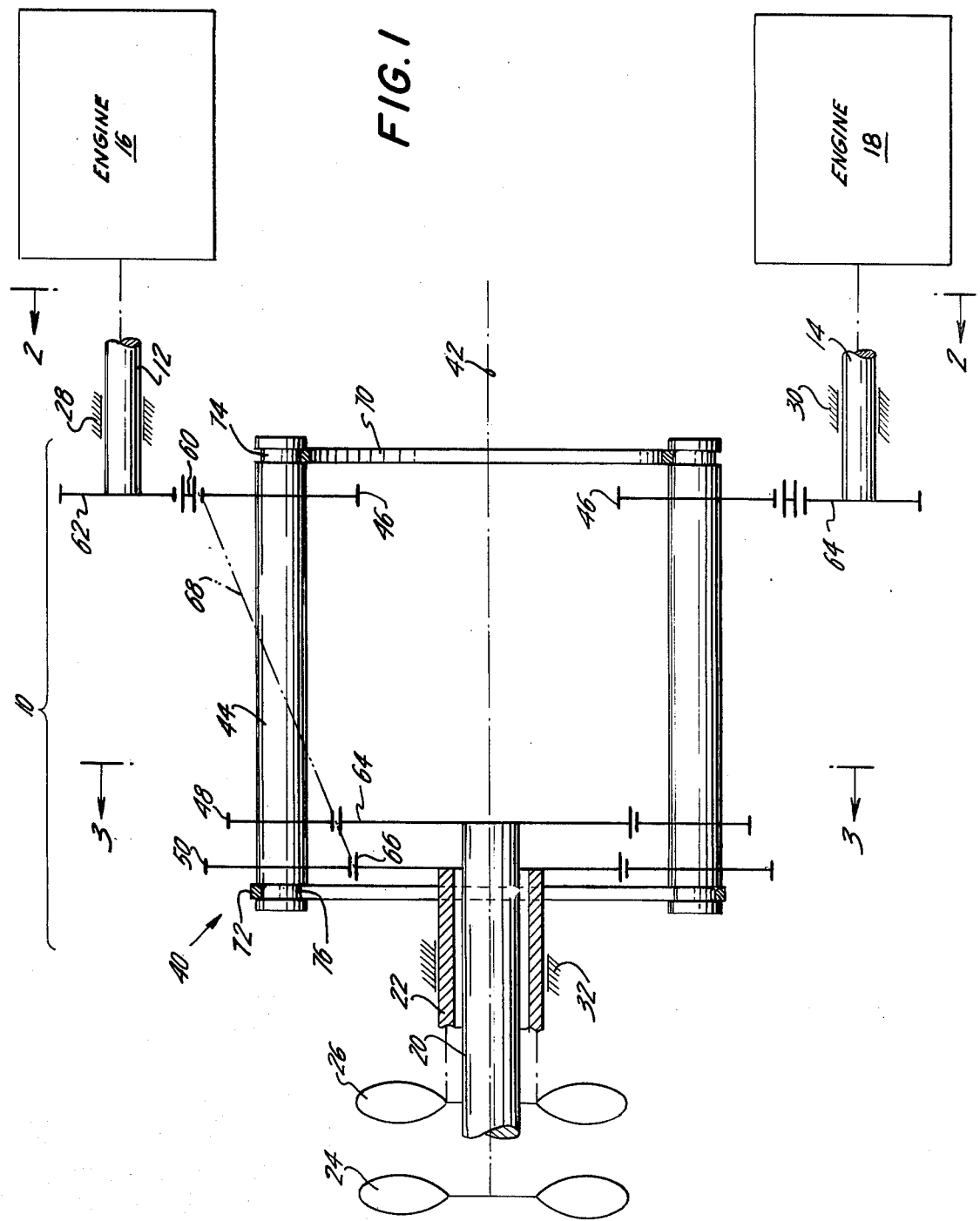
FIG. 1 is a schematic axial sectional view of a free-floating planetary transmission embodying the invention.

A free-floating planetary transmission 10 is shown for providing a high speed-ratio reduction from driveshafts 12 and 14 of engine units 16 and 18 respectively and contra-rotating co-axial output shafts 20 and 22 connected to bladed propellers 24 and 26 respectively, for example, for propelling a marine vessel. Fixed bearings 28 and 30 are provided for supporting the shafts 12 and 14 which constitute the input shafts to the transmission 10. Likewise, fixed bearings 32 are provided for supporting the co-axial output shafts 20 and 22.

The transmission 10 includes a plurality of planetary elements 40 circumferentially spaced about the axis 42 of the transmission. As shown, each planetary element 40 consists of a spindle 44 having three planet gears 46, 48 and 50, with each planet gear being secured to the spindle 44 against rotation relative to the spindle. The spindle 44 of each planetary element is parallel to the transmission axis 42 and therefore the axis of said spindle lies in a radial plane, that is, in a plane including the transmission axis.

For connecting the two engine units 16 and 18 to the transmission 10, said transmission is provided with a floating annular gear or toothed wheel 60 disposed co-axial with the transmission axis and surrounding the planetary elements 40. The annular gear 60 has internal teeth disposed in meshing engagement with the teeth of the planet gears 46 of each planetary element 40. Also, the engine shafts 12 and 14 are provided with gears or toothed wheels 62 and 64 having meshing engagement with external teeth on the annular gear 60 whereby each engine 16 and 18 has a connection with the transmission 10 which is in-line with the engine axis. With respect to the transmission output, the output shafts 20 and 22 are provided with gears 64 and 66 disposed on the radially inner side of the planetary elements 40 and in meshing engagement with the planet gears 48 and 50 respectively of each planetary element 40. The planet gears 46, 48 and 50 are sized to provide the desired speed-ratio reduction from the annular gear 60 to the output gears 62 and 64.

The planet gears 46, 48 and 50 are spaced axially along the axis of their respective spindles 44 so that the center of their gear teeth meshing with the gears 62, 64 and 66 respectively, lie on a straight line indicated by the dash-two-dot line 68. As disclosed in said prior Chillson patent, with this straight line relationship, the axial spacing of the planet gears 46, 48 and 50 of each planetary element 40 is such that the turning moment exerted by torque transmitting forces on these planet gears tending to tilt said planetary element out of its radial plane is substantially zero.

In order to restrain each planetary element 40 against radial forces thereon so as to keep the axis of its spindle in position parallel to the transmission axis 42, a pair of floating rings 70 and 72 are provided. Each ring 70 and 72 is disposed in rolling contact with the spindle 44 of each planetary element and in order to restrain each ring 70 and 72 against axial motion, each of these rings are received in annular grooves 74 and 76 respectively, formed in the spindles 44. As illustrated, the ring 70 is in rolling contact with the radially inner sides of the spindle 44 and is disposed adjacent to the planet gears 46 and the ring 72 is in rolling contact with the radially outer sides of the spindles 44 and is disposed adjacent to the planet gears 48 and 50. With this arrangement the floating ring 70 restrains radially inward motion of the planet gears 46 in response to the radial inward component of the forces on the meshing teeth of the planet gears 46 and the annular gear 60. Similarly, the floating ring 72 restrains radially outward motion of the planet gears 48 and 50 in response to the radial outward component of the forces on the teeth of the planet gears 48 and 50 meshing with the teeth of the output gears 64 and 66, respectively. In addition, the floating ring 72 will restrain its end of the planetary elements 40 against radially outward movement in response to the centrifugal forces acting on these elements. Obviously, additional floating rings could be provided if desired or needed to help provide radial restraint for the planetary elements 40. For example, if the centrifugal forces at the planet gear 46 end of the planetary element 40 were greater than the radially inward component of the forces on the meshing teeth of the planet gears 46 and the annular gear 60 then an additional floating ring (not shown) would be required having rolling contact with the radially outer sides of the spindles 44, like the ring 72, but at planet gear 46 end of the spindles.

With the free-floating transmission 10 described, the input torque to the planet gears 46 of each planetary element is applied to said planet gears on their radially outer sides relative to the transmission axis. As a result, a pair of side-by-side engine units 16 and 18 can readily be connected to the transmission without any special interconnecting gearing and without interfering with the free-floating character of the transmission. In fact, the transmission can be provided with any number of engine inputs by providing each engine unit with its own gear, such as gears 62 and 64, meshing with the external teeth on the annular gear 60.

A free-floating transmission to be successful requires that the net turning moment exerted by the input, output and reaction forces on each planetary element and tending to tilt said element out of its radial plane remains substantially zero under all operating conditions. If not, the teeth of the planet gears would become subject to excessive stresses.

The aforementioned Chillson patent (FIG. 18) discloses use of a free-floating planetary transmission for driving contra-rotating dual propellers. However, the relative power absorption of the two propellers can not be precisely determined in advance, for example, because of manufacturing tolerances, and therefore in the contra-rotating transmission of the Chillson patent it is not possible to axially space the planet gears of each planetary element with the required precision so that the turning moment tending to tilt each planetary element out of its radial plane is substantially zero. Furthermore, if the pitch setting of the blades of the two propellers is subject to change, then said zero turning moment could be achieved at only one pitch setting of said blades.

With the free-floating transmission of FIGS. 1-3, however, each output shaft furnishes the entire torque reaction for the other and, therefore, if one output shaft tends to absorb more torque than allowed by the torque reaction provided by the other shaft, said one shaft will slow down to cause the other shaft to speed up to absorb more torque. In this way a predetermined torque relation between the output shafts 20 and 22 is automatically maintained. This, of course, assumes that the torque required to drive the propellers 24 and 26 automatically increases with speed as is normal. Hence, with the free-floating planetary transmission of this invention, the transmission can be connected to contra-rotating dual outputs including contra-rotating propellers and yet the planet gears of the transmission can be so spaced axially that the turning moments on each planetary element tending to tilt this element out of its radial plane remains substantially zero under all operating conditions.

Figure 4:
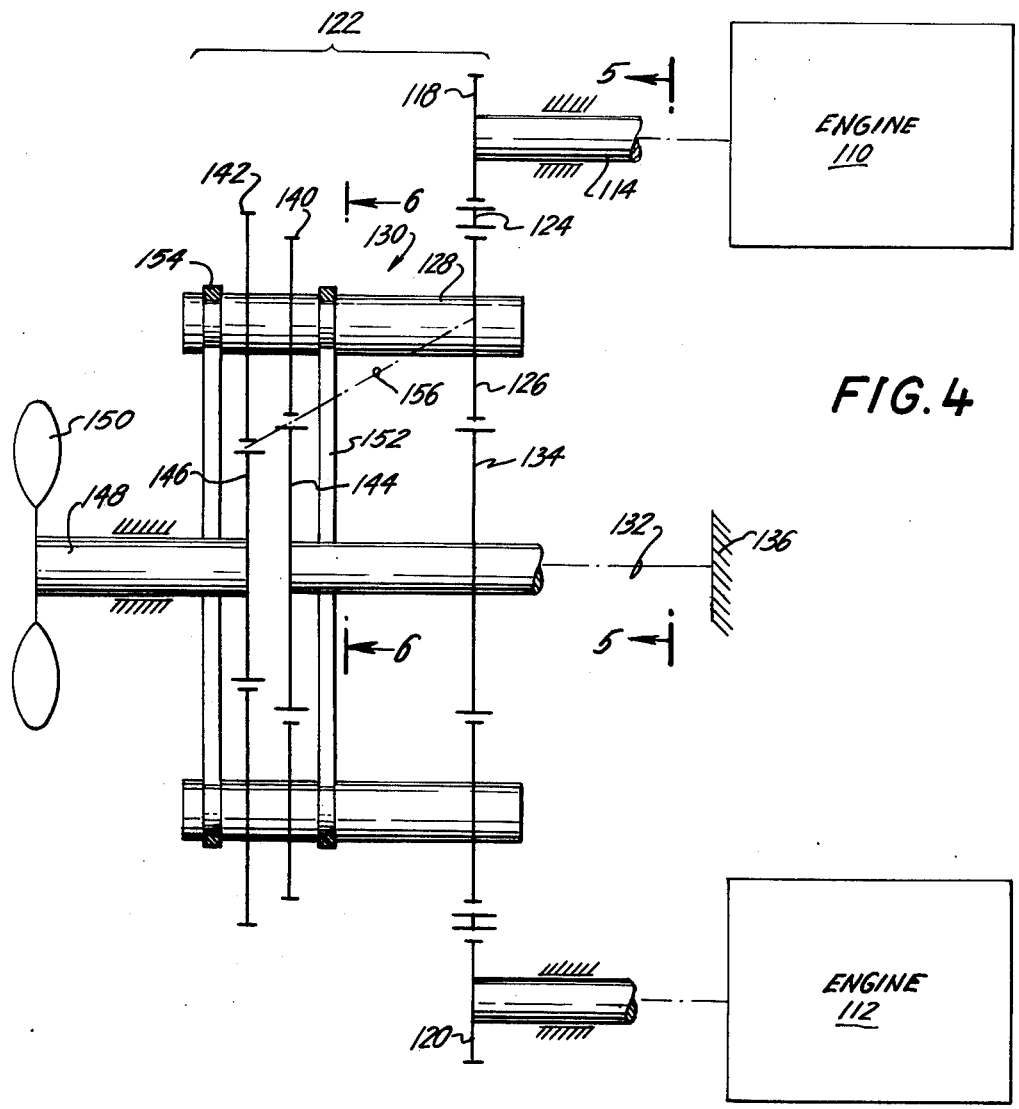
FIG. 4 is a schematic view similar to FIG. 1 but of a modified form of the invention.

With a free planetary transmission as illustrated in FIG. 1, the straight line 68 through the points of application of the input, output and torque reaction forces on each planetary element 40 extends from one radial side of the axis of its spindle 44 to the other side. As a result, each planetary element 40 has a substantial axial length. FIG. 4 discloses a modified construction for shortening the axial length of each planetary element and still provides a multiple input to the transmission, as for example, an in-line drive to the transmission from each of two engines laterally spaced apart a substantial distance.

In FIG. 4 a pair of laterally-spaced engines 110 and 112 have shafts 114 and 116 connected to gears 118 and 120 respectively, forming part of a speed reduction transmission 122. An annular gear or toothed wheel 124 has external teeth meshing with the gears 118 and 120. The annular gear 124 also has internal teeth meshing with planet gears 126 mounted on spindles 128 of planetary elements 130 which are circumferentially-spaced about the axis 132 of the transmission 122, with the axis of the spindles 128 being parallel to said transmission axis. This much of the transmission 122 is similar to the corresponding portion of the transmission 10 of FIG. 1. In FIG. 4, however, each of the planet gears 126 is also disposed in meshing engagement with a sun gear 134 which is fixed against rotation as schematically indicated at 136.

The spindle 128 of each planetary element 130 is also provided with second and third planet gears 140 and 142 secured thereto, with the planet gears 140 being disposed in mesh with a fixed sun gear 144. Since both sets of planet gears 126 and 140 mesh with fixed gears, the planet gears 140 are the same diameter as the planet gears 126 and mesh with a fixed sun gear 144 of the same diameter as and co-axial with the fixed sun gear 134. The planet gears 142 are disposed in mesh with an output gear 146 co-axial with the transmission and connected to an output shaft 148 having a propeller 150. With this construction of the transmission 122, a speed-ratio reduction is provided from the input gears 118 and 120 to the output gear 146. In this transmission, the fixed gear 144 provides reaction torque for the output torque of the gear 146. Floating rings 152 and 154 are also provided in rolling engagement with the spindles 128 to restrain said spindles against the radial forces thereon and maintain the spindles parallel to the transmission axis.

The first, second and third planet gears 126, 140 and 142 of each planetary element 130 are so spaced axially along their associated spindle 128 that the net turning moment exerted by the input, output and reaction forces tending to tilt the planetary element out of its radial plane is substantially zero. In this connection, it is noted that because of the fixed sun gear 134, the net input force from the ring gear 124 on each spindle 128 intersects the axis of the spindle 128 in the plane of the planet gears 126. As described in connection with FIG. 7 of the aforementioned Chillson patent, in such a free-planetary transmission the net turning moment tending to tilt each planetary element out of its radial plane is substantially zero when the planet gears 124, 144 and 146 are spaced so the center of the gear 126 on the axis of its spindle, and the centers of the gear teeth of the planet gears 140 and 142 meshing with the gears 144 and 146 respectively, lie on a straight line indicated by the dash-two-dot line 156.

A comparison of FIGS. 1 and 4 clearly shows that the planetary elements 130 in FIG. 4 have been substantially shortened as compared to the planetary elements 48 of FIG. 1. This shortening follows from the addition of the fixed sun gear 134 because as a result the straight line 152 determining the spacing of the planet gears 126, 140 and 142 of each planetary element 130 has one end terminating on the axis of its associated spindle 128 rather than, like each line 68 of FIG. 1, extending in both directions from the axis.

Because each planet gear 126 now meshes with two gears 124 and 134 it may restrict orientation of its spindle 128 for proper meshing of its associated planet gears 140 and 142 with the gears 144 and 146 respectively. For this reason, a suitable bearing (similar to bearing 132 in FIG. 7 of the aforementioned Chillson patent) may be provided between each planet gear 126 and its spindle 128.

In FIG. 4 the sun gear 134 determines the speed of rotation of the planetary elements 130 about the transmission axis 132. Accordingly, in the free planetary transmission of FIG. 4 it is not possible to provide a dual contra-rotating output as in FIG. 1 by substituting a second output gear for the fixed gear 144. This is so because, as already stated in connection with FIG. 1, if one output shaft tends to absorb more torque than permitted by the torque reaction provided by the other output shaft, said one output shaft will slow down thereby resulting in the other output shaft automatically speeding up to absorb more torque. This is not possible in FIG. 4. because, as stated, the sun gear 134 determines the speed of rotation of the planetary elements 130 about the transmission axis 132.

Figure 5:
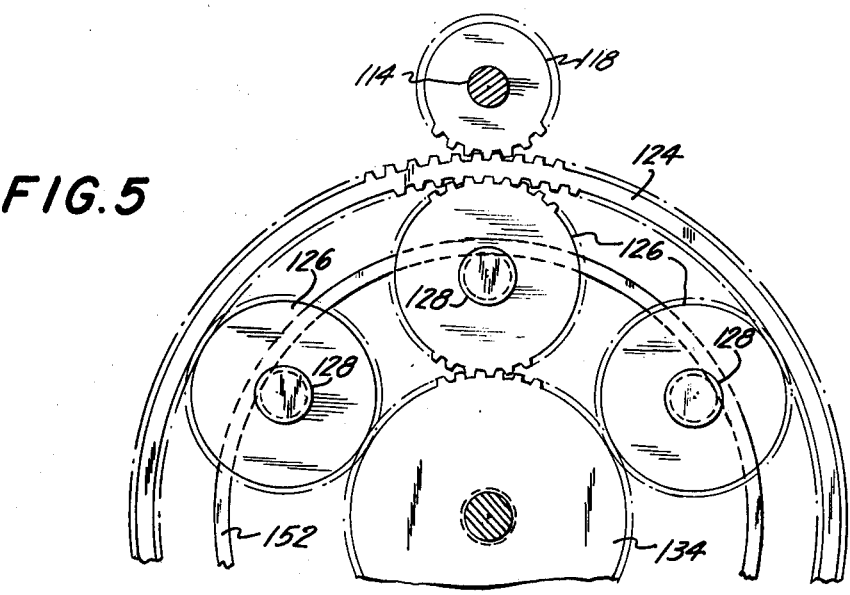
FIGS. 5 and 6 are sectional views taken along lines 5—5 and 6—6 of FIG. 4.
Figure 6:
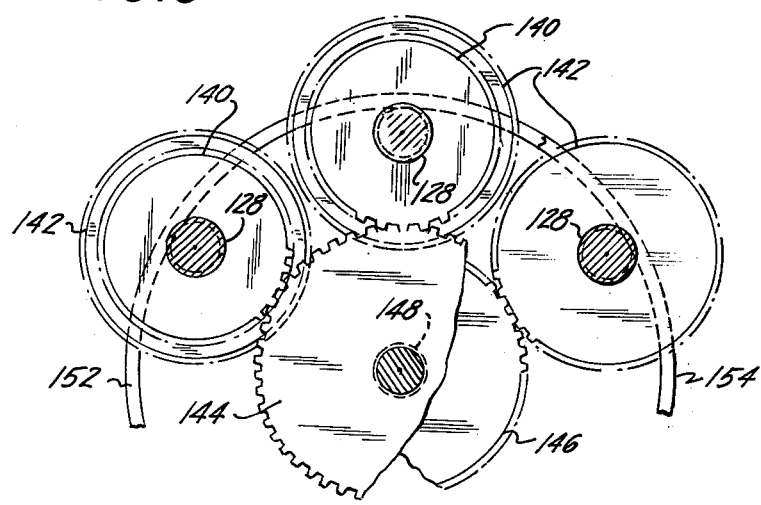

As shown in the embodiment of FIGS. 1–3, the ring gear 60 preferably has external teeth with which the transmission input gears 62 and 64 mesh. This construction provides a maximum lateral spacing between the input gears 62 and 64 whereby there is ample room for placing the two engine units 16 and 18 in side-by-side relation with each engine unit 16 and 18 having a straight co-axial connection with its transmission input gears 62 and 64 respectively. The embodiment of FIGS. 4–6 is similar in this respect.

Figure 7:
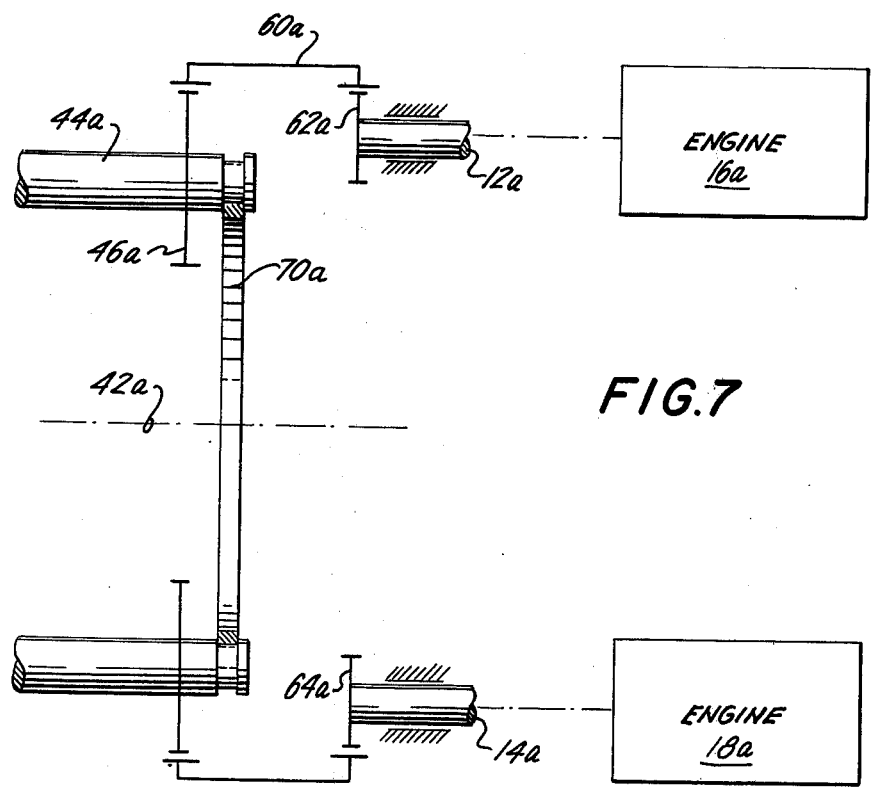
FIG. 7 is a partial view in schematic format showing a further modification of the invention.

If, however, less spacing is required between the engine units, for example as may be the case where electric motors are used for the engine units, then the transmission input gears could be spaced closer together to provide a more compact transmission. Such a modification of FIGS. 1–3 is shown in FIG. 7. For ease of understanding, the parts of FIG. 7 are designated by the same reference numerals as the corresponding parts of FIGS. 1–3 but with a subscript $a$ added thereto.

In FIG. 7, the annular gear 60a, instead of having external gear teeth for meshing engagement with the transmission input gears, as in FIGS. 1–3, has a second set of internal gear teeth for meshing engagement with the input gears 62a and 64a. Accordingly, the input gears 62a and 64a are spaced closer together than the input gears 62 and 64 of FIGS. 1–3, as is evident by comparing FIGS. 1 and 7, thereby providing a more compact transmission. The modification of FIG. 7 is suitable for relatively small engine units 16a and 18a as may be the case where electric motors are used. Obviously, the embodiment of FIGS. 4–6 may be similarly modified, as in FIG. 7, where the engine units 110 and 112 of FIGS. 4–6 are sufficiently small to permit closer lateral spacing.

It should be understood that this invention is not limited to the specific details of construction herein illustrated and that changes and modifications may occur to one skilled in the art without departing from the spirit or scope of the invention.

What is claimed is:

1. A transmission comprising:

(a) a set of free-floating planetary elements spaced circumferentially about the transmission axis and each having a spindle disposed parallel to said axis;

(b) a plurality of axially-spaced rings co-axial with the transmission axis and having rolling contact with said planetary elements to constrain said elements against the radial forces acting thereon;

(c) each said spindle having first, second and third planet gears mounted on the spindle and axially spaced therealong;

(d) a first toothed wheel co-axial with the transmission axis, said toothed wheel being annular and disposed about said planetary elements with said annular toothed wheel having internal gear teeth meshing with the first planet gear on each said spindle;

(e) at least one input gear meshing with said annular first toothed wheel, said input gear having its axis disposed parallel to the transmission axis;

(f) a second toothed wheel co-axial with the transmission axis and having gear teeth meshing with the second planet gear on each said spindle;

(g) a third toothed wheel co-axial with the transmission axis and meshing with the third planet gear on each said spindle to provide an output for the transmission, said second toothed wheel providing the entire reaction force on each planetary element to the output torque of said third toothed wheel; and (h) the three planet gears of each planetary element are so spaced apart axially along their spindle that the net turning moment exerted by the input, output and reaction forces tending to tilt each planetary element out of its radial plane including the transmission axis is substantially zero.

2. A transmission as claimed in claim 1 and including at least two such input gears spaced circumferentially about the transmission axis.

3. A transmission as claimed in claim 2 and in which said third toothed wheel provides a second output for the transmission for rotation in a direction opposite to that of the second toothed wheel such that each of said second and third toothed wheels provide the entire reaction force on said planetary elements to the output torque transmitted by the other of said toothed wheels.

4. A transmission as claimed in claim 2 and in which said annular first toothed wheel has external gear teeth with which the input gears mesh such that said input gears are disposed radially outwardly of said first toothed wheel.

5. A transmission as claimed in claim 1 in which said third toothed wheel provides a second output for the transmission such that each of said second and third toothed wheels provide the entire reaction force on said planetary elements to the output torque transmitted by the other of said toothed wheels.

6. A transmission as claimed in claim 1 and including a fixed sun gear co-axial with the transmission axis and disposed in meshing engagement with said first planet gears.

7. A transmission as claimed in claim 6 and in which said second toothed wheel is a fixed sun gear of the same diameter as said first mentioned sun gear and further in which said first and second planet gears are of the same diameter.

8. A transmission as claimed in claim 6 and including a second input gear meshing with said annular first toothed wheel and spaced circumferentially about the transmission axis from the first mentioned input gear.

9. A transmission as claimed in claim 8 in which said annular first toothed wheel has external gear teeth with which input gears mesh.

10. A transmission comprising:

(a) a set of free-floating planetary elements spaced circumferentially about the transmission axis and each having a spindle disposed parallel to said axis;

(b) a plurality of axially-spaced rings co-axial with the transmission axis and having rolling contact with said planetary elements to constrain said elements against the radial forces acting thereon;

(c) each said spindle having first, second and third planet gears mounted on the spindle and axially spaced therealong;

(d) input gear means disposed in meshing engagement with the first planet gear on each planetary element spindle to provide input torque to the transmission;

(e) a first output gear co-axial with the transmission axis and disposed in meshing engagement with the second planet gear on each planetary element spindle;

(f) a second output gear co-axial with the first output gear and disposed in meshing engagement with the third planet gear such that each output gear provides the entire reaction force on said planetary elements to the output torque transmitted by the other output gear; and (g) the three planet gears of each planetary element are so spaced axially along their spindle that the centers of their gear teeth meshing with said input gear means and said first and second output gears, respectively, lie substantially on a straight line.

11. A transmission as claimed in claim 7 in which said input gear means meshes with said first planet gears on the radially outer side of said first planet gears relative to the transmission axis and said first and second output gears mesh with the second and third planet gears, respectively, on their radially inner side relative to the transmission axis.

12. A transmission as claimed in claim 10 in which said input gear means includes an annular toothed wheel disposed about said planetary elements and having internal teeth meshing with the first planet gear on each spindle and also includes at least two input gears meshing with said annular toothed wheel and circumferentially spaced about the transmission axis.

* * * * *